Figure 1:
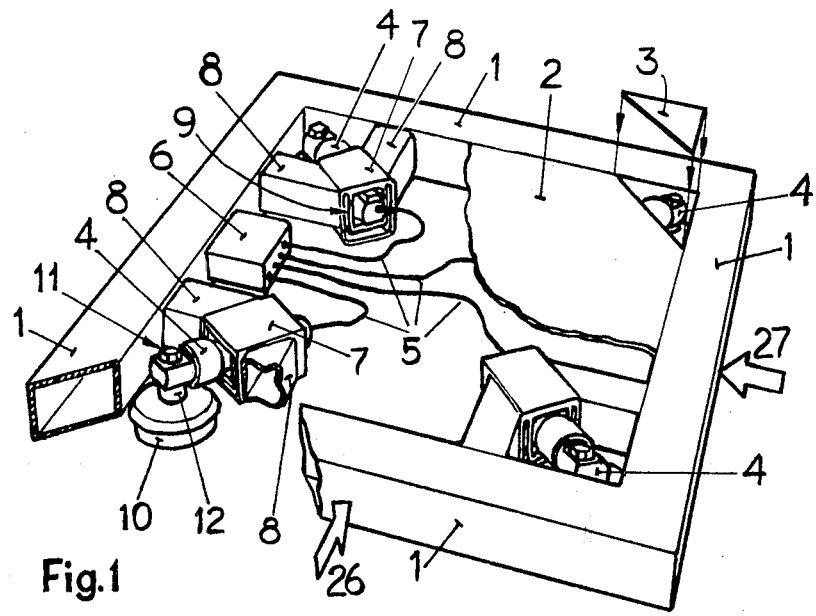

United States Patent [19]

Söderholm

[11] 4,350,218
[45] Sep. 21, 1982

[54] WEIGH-PLATFORM, RESTING ON LOAD MEASURING SUPPORT POINTS

[75] Inventor: Arne Söderholm, Furusångsvägen, Sweden

[73] Assignee: S.E.G. Resistor A.B., Vallingby, Sweden

[21] Appl. No.: 204,906

[22] Filed: Nov. 7, 1980

[30] Foreign Application Priority Data

Nov. 21, 1979 [SE] Sweden .................. 7909626

[51] Int. Cl.³ .................................. G01G 21/23
[52] U.S. Cl. ......................... 177/255; 177/211
[58] Field of Search ............ 177/255, 133, 134, 135, 177/211, 210 R, DIG. 9

[56] References Cited

U.S. PATENT DOCUMENTS

| | | | |
|---|---|---|---|
| 2,499,033 | 2/1950 | Oberholtzer | 177/211 X |
| 3,512,595 | 5/1970 | Laimins | 177/255 X |
| 3,741,328 | 6/1973 | Andersson | 177/210 |
| 3,999,621 | 12/1976 | Wagner | 177/255 X |
| 4,225,002 | 9/1980 | Soderholm | 177/255 |
| 4,258,814 | 3/1981 | Dillon | 177/211 X |

*Primary Examiner*—Joseph W. Hartary

*Attorney, Agent, or Firm*—Cushman, Darby & Cushman

[57] ABSTRACT

A device at an electromechanic platform scale with an inherent stable platform (1-3), the supporting points of the platform against the foundation provided with load measuring means in the form of substantially horizontal beams with load sensing cells (4), each of which transduces part of the load of the platform to an electric signal.

It is characteristic of the device that one end of each beam is connected to the platform (1-3) so that the connection (7,8,9) is rigid in vertical direction and elastically resilient in horizontal directions, at least in the direction perpendicularly to the longitudinal axis of the beam, and that the other end of the beam is connected to the foundation (19) of the platform so that the connection (10) is elastically resilient in both vertical and horizontal directions as well as to moments about axes in corresponding planes. Owing to this design, the load tends to be distributed uniformly between the supporting points in the case of uneven foundations, and horizontal impact loads are reduced to riskless sizes, and simultaneously the platform is stable in lateral direction.

4 Claims, 4 Drawing Figures

U.S. Patent  Sep. 21, 1982  4,350,218

WEIGH-PLATFORM, RESTING ON LOAD MEASURING SUPPORT POINTS

At electromechanical, hydraulic and pneumatic platform scales the platform is carried by load measuring means, hereinafter called load cells, of corresponding types, which are located at the platform corners. The distribution of the platform load between the load cells and the protection of the cells against overload involve problems. Great care, therefore, is required at the construction of the scale, and the principles in solving the problems depend, among other variables, on the size of the loads.

For considerable loads, for example trucks, the load distribution can be solved as disclosed in U.S. patent Ser. No. 964,067 now U.S. Pat. No. 4,225,002. For small loads, such as pallets, solutions are disclosed in U.S. Pat. No. 3,512,595. It shows a platform, in which load cells of beam type are attached in the corners, in which load is transferred to an underlying support. One end of the load beam is rigidly connected in vertical as well as horizontal direction, while the other end substantially is rigidly connected in vertical direction and resiliently in horizontal direction. It is alleged that disturbing forces thereby are not induced into the load cell when load is applied on the platform. Designed according to the aforesaid patent, the platform in some of the embodiments practically is entirely resilient in lateral direction, while in other embodiments it is elastically resilient. At the firstmentioned embodiments, rapidity of weighing is strongly limited for dynamic reasons. The latter embodiments imply that the load cells are sensitive to unintentional horizontal impact loads, which cannot be avoided at the handling of goods. For reducing such forces, greatest possible flexibility to impact loads is required.

The present invention relates to a scale platform with beam load cells, the supporting points of which are designed so that the load tends to be distributed uniformly between the supporting points in the case of uneven foundations, and horizontal impact loads are reduced to risk-free size and the platform simultaneously is stable in lateral direction.

The device according to the invention is characterized in that one end of each beam load cell is connected to the platform in such a manner, that the connection is rigid in vertical direction and elastically flexible in horizontal directions, at least in the direction perpendicular to the longitudinal axis of the beam, and that the other end of each beam which is connected to the foundation of the platform is provided with elastically flexible connection in vertical as well as horizontal directions, which latter connection also yields to moments about the vertical and horizontal axes.

The accompanying drawing shows a simple and sturdy embodiment, which is intended, for example, for a packing-room scale, where the platform directly abuts the floor, and the horizontal elasticity is limited, so that quick weighings can be carried out, but the resistance to impact loads still is high.

Figure 3:
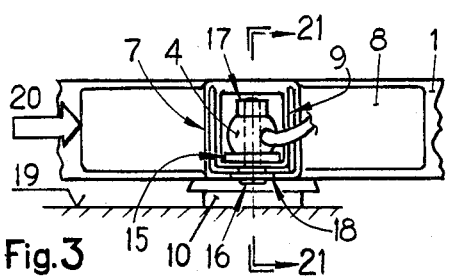
Figure 4:
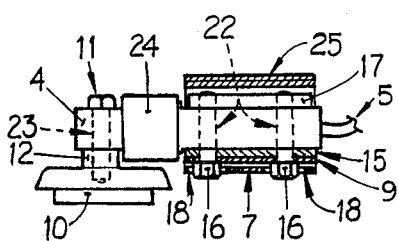
Figure 2:
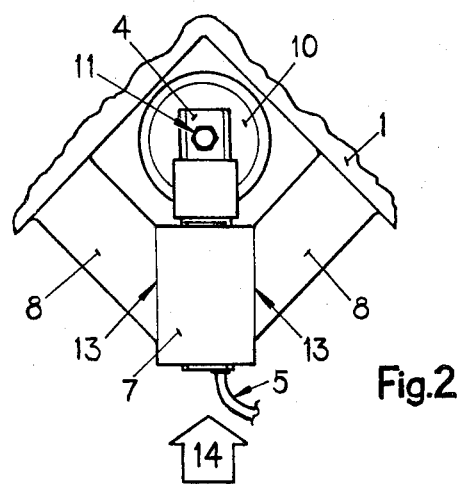

FIG. 1 is a perspective view of the platform scale, from which certain portions are cut away for showing more clearly the detail design, FIGS. 2–4 are views in three projections of the attachment means of the load cell to the platform.

FIG. 1 is a view of the platform seen obliquely from above, with a load cell mounted in each corner. The platform consists of a frame of box beams 1. The inner surface of the frame is covered in the load-carrying upper plane by a plate 2, the four gusset plates 3 of which are detachable for rendering the load cells 4 accessible. Said gusset plates 3 preferably are provided with fastening screws (not shown). The load cells 4, which are described in greater detail with reference to FIG. 4, each comprise a beam, the ends of which are provided with mounting holes. Between said ends a load sensing portion 23 (in FIG. 4) is located which is designed so as to sense the load between the ends of the beam in the direction perpendicular to the longitudinal axis of the beam. The load cells are located one in each corner of the platform, with its longitudinal axis in the bisector of the platform corner. From the end of the load cells 4 which is directed inward to the platform centre, a connection cable 5 runs to a connection box 6, to which the platform is electrically connected. The attachment of each load cell 4 to the platform comprises a plurality of members 7–9, which are shown in FIGS. 2–4 and described with reference thereto. To said unit 7–9 one end of the load cell is attached. The units 7–9 for each corner can be identically alike and be assembled to complete units, which then are attached to the frame corner. The units, thus, need not be adjusted to the frame size in each individual case, and thereby render the manufacture cheaper.

The load cells 4 are attached at their other end to elastic transfer elements 10, which thus constitute the platform supports against the foundation. The element 10 is a so-called machine mount used for damping vibrations in workshop machines and yielding elastically to horizontal as well as vertical forces and angular deflections to moments about axes in these planes. The element 10 is attached in the load cell 4 by a screw 11 via a distance tube 12, which is load balancing for the element 10. The height of the tube is so adjusted that the platform at its placement on a plane foundation has a suitable free distance between its lower surface and the foundation.

FIG. 2 shows the attachment means of the load cell to the platform from the upper side, where the entire cover plate 2,3 is removed and the inner edge of the corner of the frame 1 is visible. The load cell 4 with cable 5 is threaded into an equilateral box beam 7, which is fixed to the frame 1 by equilateral box beams 8, one short side of which is inclined 13 for reducing the load moment at the fastening surface of the beam 8 against the frame 1 to a minimum. From FIG. 2 also the transfer element 10 and its mounting screw 11 are apparent.

FIG. 3 is a view from the arrow 14 in FIG. 2. It shows the attachment of the load cell 4 threaded into the box beam 7. Within said beam 7 an inner box beam 9 is provided, which substantially has the same length as the beam 7, and the upper horizontal surface of which is joined to the corresponding horizontal surface of the beam 7. The lower horizontal surface of the beam 9 is stiffened by a plate 15 having the same length as the beam 9. The load cell 4 is attached to the lower surface of the beam 9 by two screws 16, one of which is shown, and by a nut piece 17. The beam 7 is provided at its lower horizontal surface with two holes 18, one of which is shown, through which holes the mounting screws 16 are threaded when the load cell is being mounted. From the Figure also the box beams 1 and 8 and the transfer element 10 resting against the foundation are apparent. When the platform is subjected to a horizontal force (arrow 20) in relation to the foundation 19, the element 10 as well as the vertical side surfaces of the beam 8 yield elastically to the force and, thus, substantially damp the amplitude of such forces with impact nature.

FIG. 4 is a section 21—21 in FIG. 3. The load cell 4 is shown from the side, with the cable 5 and mounting holes 22 at the end which is attached to the platform. At the other end with the hole 23, the load of the platform is transferred to the foundation via the element 10 with the mounting screw 11 and the intermediate distance tube 12. Between the ends of the load cell a portion of the load cell beam is designed to measure loads applying perpendicularly to the longitudinal axis of the load cell. Said portion is covered by a housing 24 for simplifying the Figure. As regards the design of this portion of the beam, it may be, for example, according to U.S. Pat. No. 3,180,139 and consist of a load cell with strain gauges of resistance type as load measuring device and formed so that its sensitivity to disturbing loads in horizontal directions is eliminated. The load cell 4 is attached to the horizontal lower surface of the box beam 9 by means of the stiffening plate 15 with the screws 16. The screws are threaded into the nut piece 17, which is threaded in from the side when the screws 16 are being threaded up into the holes 22 of the load cell 4. The upper surfaces of the box beam 7 and inner box beam are shown entirely melted together 25. In the lower surface of the box beam 7 the holes 18 for the screws 16 can be seen.

The scale platform as designed in FIGS. 1-4 brings about the properties as follows.

When the foundation 19 of the platform is not plane, the elastic transfer elements 10 located at the corners are deformed non-uniformly due to the inherent stability of the scale platform 1-3 and thereby balance the load distribution between the load cells 4. This balancing tendency is increased the more load is applied to the platform. When a load is being applied on the platform, the platform is deformed in spite of its inherent stable design. Hereby moments will occur primarily from the transfer elements 10. These moments, however, result in angular deflections of the lower contact surfaces of the elements 10, due to the elasticity of the elements 10, i.e. the vertical line of symmetry of the elements is inclined so that the moments freely may deform the frame 1. The elasticity in the elements thereby reduces the disturbing moments, which otherwise would be introduced through the load cells and give rise to incorrect measurement results or even destroy the load cells.

The platforms, furthermore, are subjected to rough treatment, for example when goods handling trucks drive against them. The side surfaces of the platforms, therefore, can be assumed to be exposed to horizontal impact loads, which may be of considerable size in the directions shown in FIG. 1 by the arrows 26,27 and are transferred via the load cells 4 to the foundation 19. For being able to damp the amplitude of impact loads, the body subjected thereto (in the present case the platform with load) must be capable to yield. This is achieved at the structure shown in that the attachment of the load cells to the platform and the transfer elements are elastic. Loads in the directions of the arrows 26,27 act on the load cell attachments laterally obliquely, because the longitudinal axes of the load cells extend in the bisectors of the platform corners. All loads acting laterally on the load cells cause the vertical side surfaces of the inner box beam 9 to yield. The elements 10 yield to horizontal forces in all directions, whereby the vertical axes of the elements are moved transversally. The said properties of the strcture reduce non-uniformly distributed and disturbing loads which otherwise would give rise to incorrect measurement results or destroy the load cells. It is presupposed, however, that the load cells are designed so that disturbing loads of smaller size than the nominal vertical one to be weighed do not give rise to appreciable measurement errors, because the device reduces disturbing loads, but does not eliminate them. Load cells of types in question for the device according to the present invention and designed according to the present state of art, do not involve problems in this respect.

The embodiment shown discloses only one type of yielding elements for achieving the technical effects defined in the attached claims. The attachment of the load cells can also be designed so that its mounting on the platform is elastically resilient in horizontal directions both perpendicularly and longitudinally to the longitudinal axis of the load cell. The load transferring unit between the load cell and the foundation of the platform may comprise, for example, a ball joint arrangement instead of an elastically resilient element. The platform need not be restricted to be a regular quadrangle, but can be, for example, a triangular plate. The number of support points may also be more than four. For oblong platform designs, for example, six support points can be applied.

What I claim is:

1. Electromechanical load-measuring apparatus comprising a substantially horizontal platform for receiving a load to be measured; a plurality of load-measuring means each in the form of a substantially horizontal beam which includes a load sensing cell for transducing part of the platform load to an electric signal, and means for transmitting the platform load to said load-measuring beams, said means including first connecting means connecting one end of each load-measuring beam to the platform, said first connecting means being rigid in the vertical direction and elastically resilient in horizontal directions, at least in the direction perpendicular to the longitudinal axis of the beam and second connecting means for connecting the opposite end of each beam to a foundation in a manner such that the connection is elastically resilient in the vertical plane and in horizontal planes and elastically yielding to angular deflections to moments about axes in these planes.

2. Apparatus as in claim 1 wherein each of said first connecting means includes a substantially horizontal box beam having two horizontal surfaces, respective load-measuring beam being located partly within the box beam and being attached to a horizontal surface thereof, said platform being attached to the other horizontal surface of the box beam.

3. Apparatus as in claim 2 wherein said platform includes a horizontal frame surrounding a space and a plate overlying said space and attached to said frame, said box beam and respective load-measuring beam being located in said space, each of the two vertical surfaces of said box beam being attached to said frame by at least one further substantially horizontal box beam extending at an angle to said box beam.

4. Apparatus as in claim 1, 2 or 3 wherein each of said second connecting means includes a body of elastic material.

* * * * *